US012224522B2

(12) United States Patent
Kobayashi et al.

(10) Patent No.: US 12,224,522 B2
(45) Date of Patent: Feb. 11, 2025

(54) CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shingo Kobayashi, Mie (JP); Sunghyun Byun, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/772,973

(22) PCT Filed: Oct. 19, 2020

(86) PCT No.: PCT/JP2020/039210
§ 371 (c)(1),
(2) Date: Apr. 28, 2022

(87) PCT Pub. No.: WO2021/090664
PCT Pub. Date: May 14, 2021

(65) Prior Publication Data

US 2024/0305038 A1 Sep. 12, 2024

(30) Foreign Application Priority Data

Nov. 7, 2019 (JP) ................................ 2019-202096

(51) Int. Cl.
*H01R 13/58* (2006.01)

(52) U.S. Cl.
CPC ..... *H01R 13/5812* (2013.01); *H01R 2201/26* (2013.01)

(58) Field of Classification Search
CPC ............ H01R 13/5806; H01R 13/5812; H01R 2201/26
See application file for complete search history.

(56) References Cited

U.S. PATENT DOCUMENTS 3,638,169 A * 1/1972 Caveney ............ H01R 13/5804 439/471
4,900,277 A 2/1990 Inaba et al.
(Continued)

FOREIGN PATENT DOCUMENTS

JP 2003-346966 A 12/2003
JP 2017-228475 A 12/2017

OTHER PUBLICATIONS

International Search Report issued on Nov. 17, 2020 for WO 2021/090664 A1 (4 pages).

*Primary Examiner* — Briggitte R. Hammond
(74) *Attorney, Agent, or Firm* — Venjuris, P.C.

(57) ABSTRACT

It is aimed to provide a connector of a novel structure capable of suppressing or preventing the transmission of the swing of a wire to a terminal in a connector. A connector 10 is provided with a housing 16 for accommodating a terminal 12, a back retainer 20 mounted in a rear end part of the housing 16 from which a wire 18 connected to the terminal 12 is pulled out, a wire insertion hole 62 provided in the back retainer 20, and a wire holding piece 72 projecting in a pull-out direction of the wire 18 from a peripheral edge part of the wire insertion hole 62. The wire 18 pulled out from the wire insertion hole 62 is tied and fixed to the wire holding piece 72 by a tying tool 82.

7 Claims, 4 Drawing Sheets

(56) References Cited

U.S. PATENT DOCUMENTS

| | | | | |
|---|---|---|---|---|
| 5,700,156 | A * | 12/1997 | Bussard | H01R 13/5804 439/471 |
| 6,478,609 | B1 * | 11/2002 | Davis | H01R 13/5812 439/465 |
| 9,537,249 | B2 * | 1/2017 | Grudzewski | H01R 13/582 |
| 10,516,230 | B2 * | 12/2019 | Kot | H01R 13/582 |
| 2010/0261364 | A1 | 10/2010 | Matsuoka | |
| 2016/0254614 | A1 | 9/2016 | Matsumura | |

* cited by examiner

CONNECTOR

CROSS REFERENCE TO RELATED APPLICATIONS

This application is a national phase of PCT application No. PCT/JP2020/039210, filed on 19 Oct. 2020, which claims priority from Japanese patent application No. 2019-202096, filed on 7 Nov. 2019, all of which are incorporated herein by reference.

TECHNICAL FIELD

The present disclosure relates to a connector provided with a back retainer.

BACKGROUND

Conventionally, a connector including a housing for accommodating a terminal and a back retainer mounted in a rear end part of the housing from which a wire connected to the terminal is pulled out as described in Japanese Patent Laid-open Publication No. 2010-246339 (Patent Document 1) is known as one type of a connector used to electrically connect in-vehicle devices. The back retainer has a function of preventing the separation of a seal rubber for sealing between the housing and the wire by being fit to the wire in advance from the rear end part of the housing.

PRIOR ART DOCUMENT

Patent Document

Patent Document 1: JP 2010-246339 A

SUMMARY OF THE INVENTION

Problems to be Solved

Since power used has relatively high voltage and large current in electric vehicles, hybrid vehicles and the like, wires become larger in size and the weights thereof tend to increase. As a result, there has been a problem that the wires easily swing. If the swing of the wire is transmitted to a terminal in a connector, there is also a possibility of problems such as an increase of a contact resistance caused by plating wear and a spark caused by contact separation when a contact point portion with a mating terminal moves.

The present disclosure was developed in view of the above situation and aims to provide a connector of a novel structure capable of suppressing or preventing the transmission of the swing of a wire to a terminal in the connector.

Means to Solve the Problem

The present disclosure is directed to a connector with a housing for accommodating a terminal, a back retainer mounted in a rear end part of the housing, a wire connected to the terminal being pulled out from the rear end part of the housing, a wire insertion hole provided in the back retainer, and a wire holding piece projecting in a pull-out direction of the wire from a peripheral edge part of the wire insertion hole, the wire pulled out from the wire insertion hole being tied and fixed to the wire holding piece by a tying tool.

Effect of the Invention

According to the present disclosure, it is possible to provide a connector capable of suppressing or preventing the transmission of an external force caused by a displacement such as a wire swing to a terminal in a connector.

DETAILED DESCRIPTION TO EXECUTE THE INVENTION

Description of Embodiments of Present Disclosure

Figure 1:
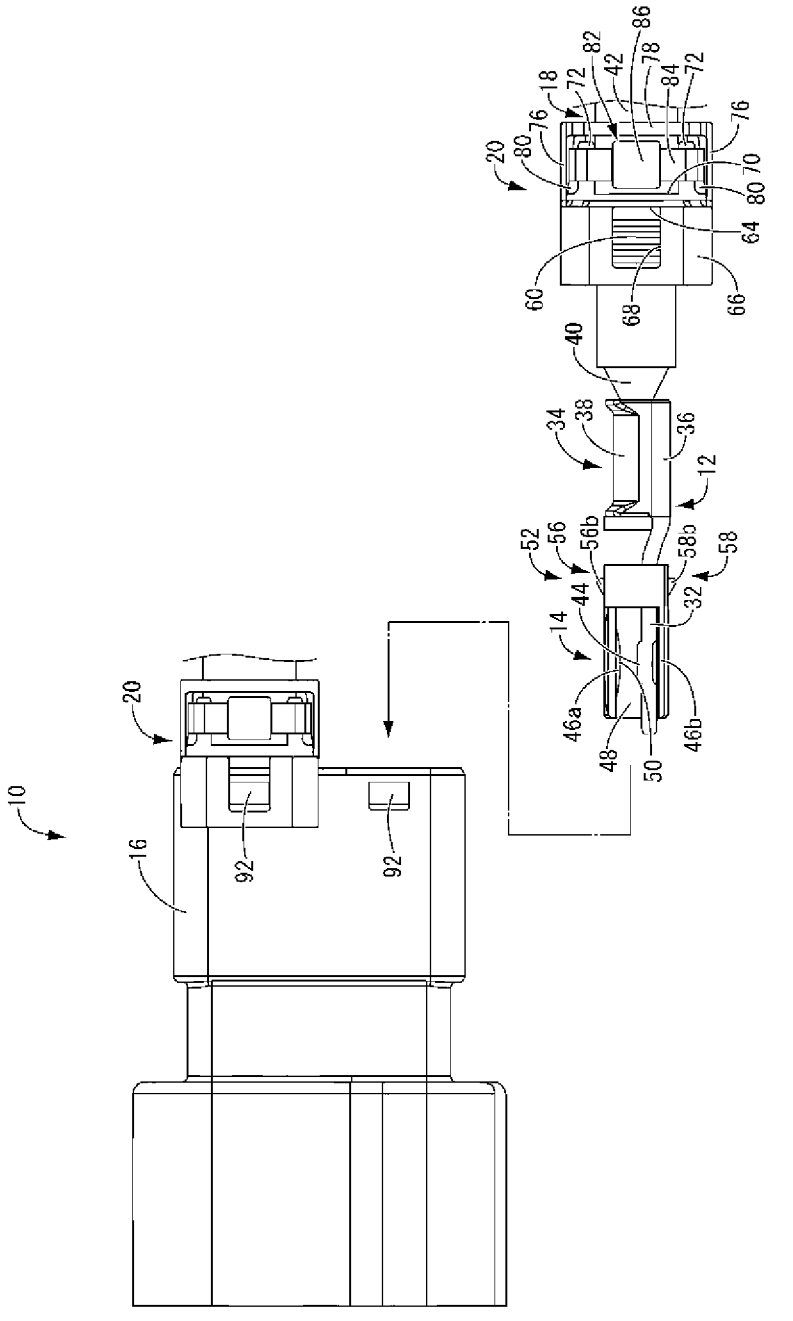
FIG. 1 is an exploded side view showing a connector according to an embodiment of the present disclosure.

First, embodiments of the present disclosure are listed and described.

(1) The connector of the present disclosure is provided with a housing for accommodating a terminal, a back retainer mounted in a rear end part of the housing, a wire connected to the terminal being pulled out from the rear end part of the housing, a wire insertion hole provided in the back retainer, and a wire holding piece projecting in a pull-out direction of the wire from a peripheral edge part of the wire insertion hole, the wire pulled out from the wire insertion hole being tied and fixed to the wire holding piece by a tying tool.

According to the connector of the present disclosure, the wire holding piece is provided which projects from the peripheral edge part of the wire insertion hole of the back retainer, and the wire pulled from the wire insertion hole is tied and fixed to the wire holding piece by the tying tool. In this way, an external force applied from the wire toward the terminal due to a displacement such as wire tension caused by the swing of the wire or a temperature change is absorbed by the wire holding piece and reliably dispersed to the housing via the back retainer. As a result, it can be reliably suppressed or prevented that the external force is transmitted from the wire to the terminal in the connector and it is possible to prevent problems such as plating wear, an increase of a contact resistance and, further, the generation of a spark caused by contact separation when a contact point portion of the terminal with a mating terminal moves due to a displacement such as a wire swing.

Particularly, since it is sufficient to tie and fix the wire to the wire holding piece projecting from the peripheral edge part of the wire insertion hole using the tying tool, the transmission of an external force from the wire to the terminal can be reliably prevented or suppressed by a simple structure.

Note that any of arbitrary tying tools such as a zip tie and a binding tape can be adopted as long as the tying tool can tie and fix the wire to the wire holding piece. Further, the number of the wire holding piece(s) may be one or more.

(2) Preferably, a pair of the wire holding pieces are provided to project at two positions facing each other in a radial direction of the wire insertion hole, and the wire is sandwiched and tied and fixed between the pair of wire holding pieces from both sides in the radial direction. This is because the wire can be sandwiched between the pair of wire holding pieces projecting at the two positions facing each other in the radial direction of the wire and the transmission of a displacement of the wire toward the terminal can be more reliably suppressed or prevented by more reliably absorbing the displacement such as a wire swing.

(3) In (2) described above, preferably, the pair of wire holding pieces are deflectable and deformable outward in the radial direction, wire pressing portions are respectively provided to project on inner peripheral surfaces of the pair of wire holding pieces, and a radial separation distance between projecting tip parts of the wire pressing portions is set smaller than an outer diameter of the wire. Since the pair of wire holding pieces are deflectable and deformable outward in the radial direction, an operation of inserting and arranging the wire between the pair of wire holding pieces can be easily performed. Further, the radial separation distance between the projecting tip parts of the wire pressing portions projecting on the inner peripheral surfaces of the pair of wire holding pieces is set smaller than the outer diameter of the wire. In this way, the wire can be reliably temporarily held between the wire pressing portions before tying, and an operation of tying the wire to the wire holding pieces by the tying tool can be easily performed. Further, in a tied state, the wire pressing portions can be pressed to bite into the wire from both sides in the radial direction, and the holding of the wire by the wire holding pieces can be more stably realized.

(4) In (3) described above, the wire pressing portion preferably has a hemispherical shape. This is because an engaging margin of the wire pressing portion with an insulation coating of the wire can be stably ensured against an external force of any direction transmitted from the wire.

(5) Preferably, the connector includes an outer peripheral wall separated on an outer peripheral side of the wire holding piece and projecting in the pull-out direction of the wire and a cover wall projecting from a projecting end side of the outer peripheral wall toward the wire holding piece, and an accommodation region for the tying tool is formed by a clearance between the wire holding piece and the outer peripheral wall and the escape of the tying tool from the accommodation region is obstructed by the contact of the tying tool with the cover wall. This is because the accommodation region for the tying tool can be secured with good space efficiency by a simple structure of providing the outer peripheral wall projecting and separated on the outer peripheral side of the wire holding piece. Moreover, this is because the escape of the tying tool from the accommodation region can be stably obstructed by a simple structure of providing the cover wall projecting toward the wire holding piece on the projecting end side of the outer peripheral wall.

Note that the outer peripheral wall may have any shape as long as the accommodation region for the tying tool can be formed in the clearance between the outer peripheral wall and the wire holding piece. For example, the outer peripheral wall may be shaped in the form of a projecting piece like the wire holding piece, shaped to arcuately project over a predetermined circumferential distance of the wire insertion hole or shaped to annularly extend over the entire circumference of the wire insertion hole. Similarly, the cover wall can also have any shape as long as the escape of the tying tool from the accommodation region can be obstructed.

(6) In any one of (2) to (4) described above, preferably, the connector includes a pair of outer peripheral walls in the form of projecting pieces respectively separated on outer peripheral sides of a pair of the wire holding pieces and projecting in the pull-out direction of the wire and an annular cover wall projecting from projecting end sides of the pair of outer peripheral walls toward the wire holding pieces and coupling the projecting end sides of the pair of outer peripheral walls to each other, and a pair of accommodation regions for the tying tool are formed by a pair of clearances between the pair of wire holding pieces and the pair of outer peripheral walls and the escape of the tying tool from the accommodation regions is obstructed by the contact of the tying tool with the cover wall. This is because the pair of accommodation regions can be provided on the outer peripheral sides of the pair of wire holding pieces, i.e. on both sides in the radial direction of the wire, and the tying tool can be more stably accommodated and held. Moreover, since the projecting end sides of the pair of outer peripheral walls in the form of projecting pieces are coupled to each other by the annular cover wall, the strength of the outer peripheral walls in the form of projecting pieces can also be stably ensured. Therefore, the tying tool accommodation regions provided with a function of preventing the escape of the tying tool while reducing material cost and weight can be advantageously constructed.

Details of Embodiment of Present Disclosure

A specific example of a connector of the present disclosure is described below with reference to the drawings. Note that the present disclosure is not limited to these illustrations and is intended to be represented by claims and include all changes in the scope of claims and in the meaning and scope of equivalents.

Embodiment

An embodiment of the present disclosure is described below with reference to FIGS. 1 to 4. As shown in FIG. 1, a connector 10 in this embodiment includes a housing 16 for accommodating terminals 12 and spring members 14, wires 18 connected to the terminals 12 and extending out from a rear end part of the housing 16, and back retainers 20 for holding the wires 18 by being mounted into the rear end part of the housing 16. Note that, for a plurality of identical members, only some members may be denoted by a reference sign and the other members may not be denoted by the reference sign. As is clear from FIGS. 1 and 2, two wires 18 with the terminals 12 are accommodated and held in the housing 16 in the connector 10 of this embodiment. Since the two wires 18 with the terminals 12, and the back retainers 20 and later-described seal members 60 to be mounted on the wires 18 are identically structured, one wire 18 with the terminal 12 is described in detail below.

<Housing 16>

Figure 2:
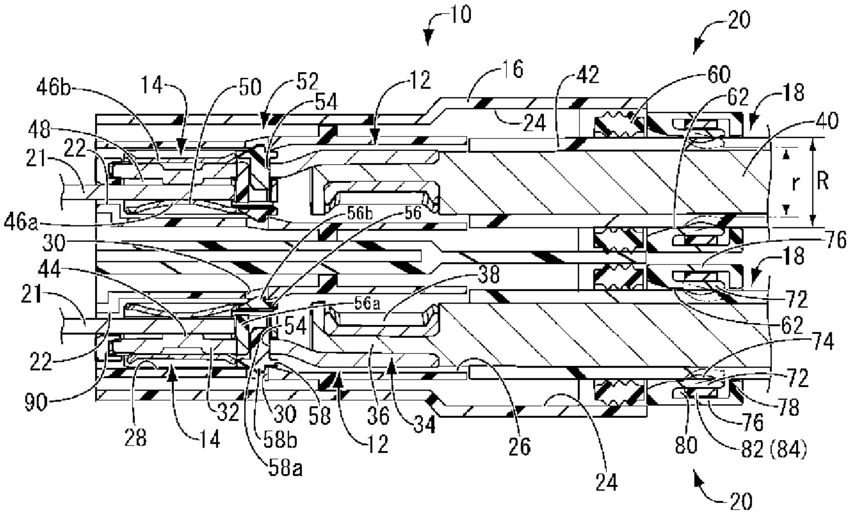
FIG. 2 is a longitudinal section showing the connector in an assembled state in FIG. 1 (wire holding pieces when wires are not inserted yet are shown by virtual lines).

As shown in FIGS. 1 and 2, the terminal 12 is accommodated into the housing 16 of the connector 10 together with the spring member 14 and used as the connector 10. The housing 16 is made of synthetic resin and has a rectangular tube shape extending in a longitudinal direction and open in the front-rear direction. Mating terminal insertion holes 22, into which mating terminals 21 are inserted, are formed at two vertically spaced apart positions on a front side of the housing 16, and terminal insertion holes 24, into which the terminals 12 are inserted, are formed at two vertically spaced apart positions on a rear side of the housing 16. The mating terminal insertion holes 22 and the terminal insertion holes 24 formed at the above two positions respectively communicate with cavities 26 having a rectangular cross-sectional shape, spaced apart in the vertical direction and extending in the longitudinal direction. A spring member accommodating portion 28 in the form of a recess is formed in a wall part on a front end side of the cavity 26, and engaging holes 30 are respectively formed in upper and lower walls on a rear side of the spring member accommodating portion 28.

<Terminal 12>

As shown in FIG. 1, the terminal 12 is a connection terminal in the form of a flat plate. A metal material such as copper, copper alloy, aluminum, aluminum alloy or stainless steel can be appropriately used as a material of the terminal 12. A surface processing such as silver plating, tin plating or aluminum plating may be applied to the terminal 12 according to the type of the constituent metal thereof and a use environment. The terminal 12 can be, for example, formed by press punching a metal plate excellent in conductivity. The terminal 12 includes a mating terminal connecting portion 32 to be electrically connected to the mating terminal 21 (see FIG. 2) on a tip side (left side in FIG. 1) and a core crimping portion 34 to be connected to the wire 18 on a base end side (right side in FIG. 2). The core crimping portion 34 includes a bottom wall 36 in the form of a rectangular flat plate and a pair of crimping pieces 38, 38 in the form of rectangular flat plates projecting from both widthwise side edge parts of the bottom wall 36. A core 40 of the wire 18 is conductively connected to this core crimping portion 34. The wire 18 is structured such that the core 40 formed by bundling a plurality of wires made of copper, aluminum or another metal, which is a conductor, is covered with an insulation coating 42 having an electrically insulating property and made of ethylene resin, styrene resin or the like. After the core 40 exposed by stripping the insulation coating 42 in an end of the wire 18 is placed on the bottom wall 36 of the core crimping portion 34, the core crimping portion 34 is crimped using a known crimping technique. In this way, the core crimping portion 34 including the bottom wall 36 and the pair of crimping pieces 38, 38 is plastically deformed and crimped to embrace the outer peripheral surface of the core 40, and the core 40 of the wire 18 is conductively connected to the terminal 12.

<Contact Point Portion 44>

As shown in FIGS. 1 and 2, the terminal 12 includes a contact point portion 44 formed into a curved surface bulging toward the mating terminal 21 on a surface facing the mating terminal 21. The contact point portion 44 has a gently curved surface, which is nearly a flat surface. In this embodiment, the contact point portion 44 is in the form of a strip expanding over the entire length in a width direction in a longitudinal part.

<Spring Member 14>

The spring member 14 is formed using various pressable or punchable metal materials such as strip plates of spring steel, stainless steel, brass, phosphor bronze and beryllium copper. A surface processing such as silver plating, tin plating or aluminum plating may be applied to the spring member 14 according to the type of the constituent metal thereof and a use environment. As shown in FIG. 2, the spring member 14 is such that pressing pieces 46*a*, 46*b* are respectively overlapped to vertically sandwich the mating terminal connecting portion 32 and the mating terminal 21 from both sides in an overlapping direction (vertical direction in FIGS. 1 and 2) with the mating terminal 21 overlapped on the mating terminal connecting portion 32 of the terminal 12. Widthwise right end parts (back end parts in FIGS. 1 and 2) of the pressing pieces 46*a*, 46*b* are coupled by a coupling portion 48 in the form of a rectangular flat plate. The pressing piece 46*a* of the spring member 14 configured to come into contact with the mating terminal 21 includes a spherical shell shaped pressing point 50 bulging toward the mating terminal 21.

<Spring Member Retainer 52>

As shown in FIG. 2, the terminal 12 includes an engaging hole 54 between the mating terminal connecting portion 32 and the core crimping portion 34. The engaging hole 54 is formed to penetrate through the terminal 12 in a plate thickness direction. The spring member retainer 52 is, for example, made of synthetic resin excellent in heat resistance and rigidity, and includes an upper spring member retainer divided body 56 and a lower spring member retainer divided body 58. The upper and lower spring member retainer divided bodies 56, 58 are assembled with and fixed to each other by an unillustrated engaging mechanism. The upper spring member retainer divided body 56 is provided with an engaging protrusion 56*a* having a rectangular cross-sectional shape and projecting downward and an engaging projection 56*b* having a triangular cross-sectional shape and projecting upward. The lower spring member retainer divided body 58 is provided with an engaging protrusion 58*a* having a rectangular cross-sectional shape and projecting upward and an engaging projection 58*b* having a triangular cross-sectional shape and projecting downward. As shown in FIG. 2, the engaging protrusion 56*a* of the upper spring member retainer divided body 56 is engaged with a front side of the engaging hole 54 of the terminal 12 and the engaging protrusion 58*a* of the lower spring member retainer divided body 58 is engaged with a rear side of the engaging hole 54 of the terminal 12. In such a state, the upper and lower spring member retainer divided bodies 56, 58 are assembled with each other and fixed to the terminal 12.

<Back Retainer 20>

Figure 3:
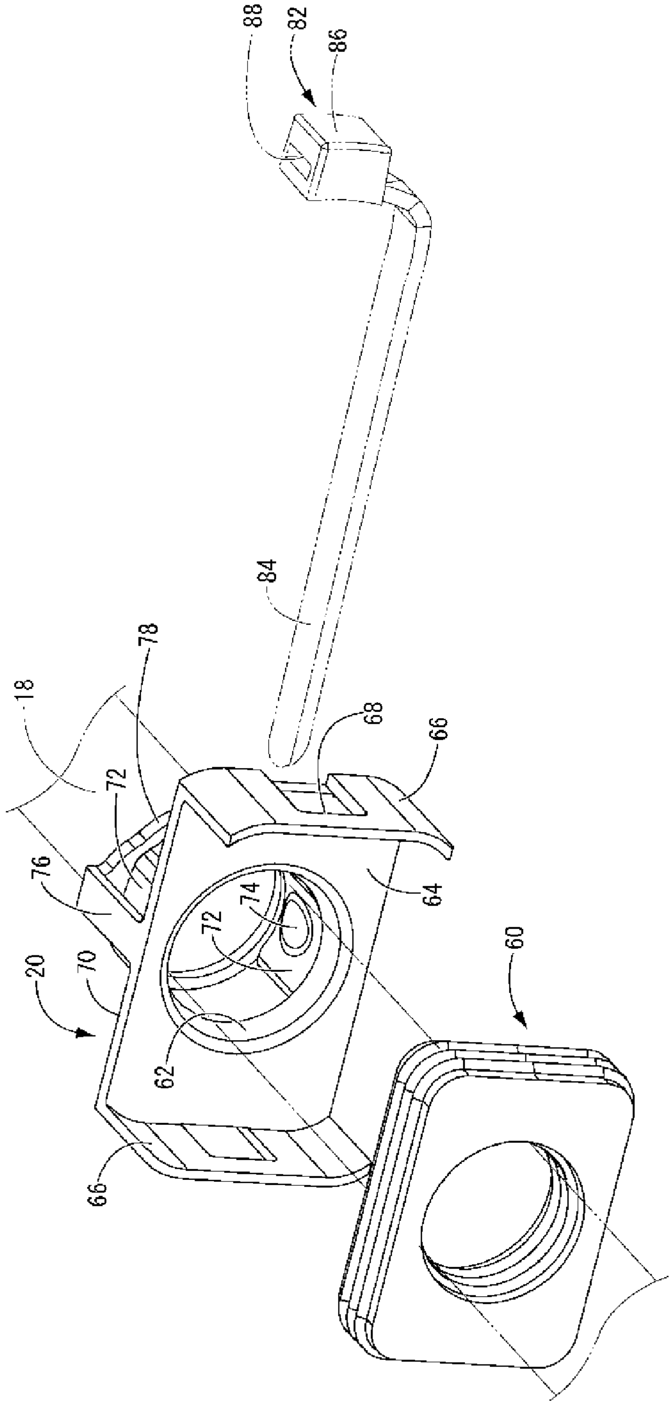
FIG. 3 is an exploded perspective view showing a seal member, a back retainer and a zip tie to be connected to one wire in FIG. 2 (the wire and the zip tie before being tied are shown by virtual lines).
Figure 4:
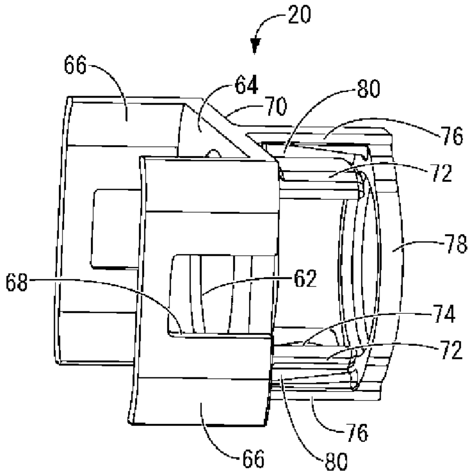
FIG. 4 is a side perspective view of the back retainer shown in FIG. 3 when viewed obliquely from above.

The back retainer 20 and the seal member 60 are mounted on the end of the wire 18. That is, the back retainer 20 and the seal member 60 are mounted into the rear end part of the housing 16 from which the wire 18 connected to the terminal 12 is pulled out. As shown in FIGS. 3 and 4, the back retainer 20 has a substantially rectangular flat plate shape and is formed with a circular wire insertion hole 62 penetrating in a plate thickness direction in a central part. Side walls 66 in the form of rectangular flat plates and projecting forward (leftward in FIG. 4) over the entire lengths are provided on both end edge parts in the width direction (lateral direction in FIG. 3) of a front surface 64 of the back retainer 20. Rectangular engaging holes 68 penetrating in the plate thickness direction while having such a length from both widthwise end edge parts of the front surface 64 of the back retainer 20 as not to reach projecting end parts of the side walls 66 are formed in vertically central parts of the side walls 66. Peripheral edge parts facing each other in a radial direction (vertical direction in FIGS. 3 and 4) of the wire insertion hole 62 in a rear surface 70 of the back retainer 20 are provided with wire holding pieces 72 having an arcuate cross-sectional shape and projecting from the peripheral edge parts in a pull-out direction (rightward in FIG. 4) of the wire 18. That is, a pair of the wire holding pieces 72, 72 are provided to project from the peripheral edge parts at two positions facing each other in the radial direction of the wire insertion hole 62.

Further, the pair of wire holding pieces 72, 72 are cantilevered from the peripheral edge parts of the wire insertion hole 62 while having an arcuate cross-section shape, and deflectable and deformable radially outwardly of the wire insertion hole 62. Furthermore, a wire pressing portion 74 is provided to project radially inwardly of the wire holding piece 72 in a central part of the inner peripheral surface of each of the pair of wire holding pieces 72, 72. Here, a curvature of the inner peripheral surface of the wire holding piece 72 is substantially equal to that of the outer peripheral surface of the wire 18, so that the wire 18 can be stably held by the pair of wire holding pieces 72, 72 as described later. Moreover, the wire pressing portion 74 has a hemispherical shape. Thus, even if an external force is transmitted from the wire 18 in any direction, engagement margins of the wire pressing portions 74 with the insulation coating 42 of the wire 18, i.e. sinking amounts of the wire pressing portions 74 into the insulation coating 42 can be substantially equal, and a fixed sinking amount can be stably ensured. In addition, as shown in FIG. 2, a radial separation distance r between projecting tip parts of the wire pressing portions 74 of the pair of wire holding pieces 72, 72 when the wire is not inserted yet is set smaller than an outer diameter R of the wire 18.

Further, outer peripheral walls 76, 76 in the form of projecting pieces projecting from the rear surface 70 in the pull-out direction (rightward in FIG. 4) of the wire 18 are provided in widthwise central parts of end edge parts in the vertical direction of the back retainer 20. An annular cover wall 78 is arranged on the projecting ends of the pair of outer peripheral walls 76, 76, and the pair of outer peripheral walls 76, 76 are coupled to each other via the cover wall 78. The cover wall 78 is disposed concentrically with the wire insertion hole 62, so that the wire 18 pulled out from the wire insertion hole 62 is pulled out through a center hole of the cover wall 78. Here, the pair of outer peripheral walls 76, 76 are separated on outer peripheral sides of the pair of wire holding pieces 72, 72. The cover wall 78 projects and expands radially inward from the pair of outer peripheral walls 76, 76 and, as shown in FIG. 2, an inner peripheral side of the cover wall 78 is separated axially outward (rightward in FIG. 2) from projecting parts of the pair of wire holding pieces 72, 72 and overlap these projecting parts in axial projection. In this way, clearances are formed between the pair of wire holding pieces 72, 72 and the pair of outer peripheral walls 76, 76, and a pair of accommodation regions 80, 80 for accommodating a strip-like portion 84 of a zip tie 82 constituting a tying tool to be described later are formed by this pair of clearances. Further, the strip-like portion 84 of the zip tie 82 comes into contact with the cover wall 78, thereby obstructing the escape of the zip tie 82 from the pair of accommodation regions 80, 80.

<Zip Tie 82>

As shown in FIG. 3, the zip tie 82 includes the strip-like portion 84 in the form of an elongated flat plate having a rectangular cross-section, and a block-like head portion 86 is formed on one longitudinal end part of this strip-like portion 84. The zip tie 82 is integrally molded from a synthetic resin material and the strip-like portion 84 is curvable and deformable. Further, many unillustrated locking projections are formed side by side in the longitudinal direction on the strip-like portion 84, and the strip-like portion 84 can be unreleasably locked to an unillustrated locking piece projecting in an insertion hole 88 of the head portion 86 by curving the strip-like portion 84 into a ring and inserting a tip part of the strip-like portion 84 into the insertion hole 88.

<Seal Member 60>

The seal member 60 is made of rubber and, as shown in FIGS. 2 and 3, mounted on the outer peripheral surface of the wire 18 on the side of the terminal 12 adjacent to the back retainer 20 on the end of the wire 18.

Assembling Method of Embodiment

An assembling method of this embodiment is briefly described below. At first, the back retainer 20 and the seal member 60 are fit in this order on the insulation coating 42 on the end part of the wire 18 in advance. Then, the terminal 12 is prepared and the core crimping portion 34 of this terminal 12 is crimped to the core 40 of the wire 18 for conductive connection. Subsequently, the spring member retainer 52 composed of the upper and lower spring member retainer divided bodies 56, 58 is mounted into the engaging hole 54 of the terminal 12 and the spring member 14 is arranged on the mating terminal connecting portion 32 of the terminal 12. The two wires 18 configured in this way are respectively inserted into predetermined terminal insertion holes 24 of the housing 16 of the connector 10 with the mating terminal connecting portions 32 in the lead, and pushed to the backs. In this way, the spring members 14 arranged on the mating terminal connecting portions 32 of the terminals 12 are stably accommodated in the predetermined spring member accommodating portions 28 in the housing 16 as shown in FIG. 2. That is, tip parts of the mating terminal connecting portions 32 of the terminals 12 are engaged with fitting holes 90 provided on the tip side of the housing 16 and the engaging projections **56*b*, 58*b* of the spring member retainers 52 are fit into the engaging holes 30 provided on rear sides of the spring member accommodating portions 28 of the housing 16. Thereafter, the seal member 60 and the back retainer 20 are moved toward the housing 16 and the back retainer 20 is fit into the housing 16. In this way, as shown in FIG. 2, the pair of wire holding pieces 72, 72 are deflected and deformed radially outwardly of the wire insertion hole 62 and the radial separation distance r between the projecting tip parts of the wire pressing portions 74 in the pair of wire holding pieces 72, 72 becomes equal to the outer diameter R. As a result, the wire 18 is held pressed by resilient restoring forces of the wire pressing portions 74. Further, as shown in FIG. 1, the engaging holes 68 provided in the side walls 66 of the back retainer 20 are respectively engaged with engaging projections 92 provided at facing positions of side walls on the rear side of the housing 16. Finally, as shown in FIGS. 1 and 2, the wire 18 pulled out from the wire insertion hole 62 of the back retainer 20 is tied and fixed to the pair of wire holding pieces 72, 72 using the zip tie 82 serving as a tying tool, whereby the connector 10 of this embodiment is completed. That is, after the strip-like portion 84 of the zip tie 82 is wound on the outer peripheral surfaces of the pair of wire holding pieces 72, 72 and the tip part of the strip-like portion 84 is inserted into the insertion hole 88 and tightened as shown in FIG. 3, an extra tip part of the strip-like portion 84 extending out from the insertion hole 88 is cut. As a result, as shown in FIG. 2, the strip-like portion 84 is accommodated in the pair of accommodation regions 80, 80, and the wire 18 is sandwiched and tied and fixed between the pair of wire holding pieces 72, 72 from both sides in the radial direction of the wire insertion hole 62 of the back retainer 20. As shown in FIGS. 1 and 2, in this embodiment, two wires 18 with the terminals 12 are similarly mounted into the housing 16** by the aforementioned assembling method.

According to the connector 10 of the present disclosure configured as just described, the wire 18 pulled out from the wire insertion hole 62 of the back retainer 20 is tied and fixed to the pair of wire holding pieces 72, 72 using the zip tie 82. In this way, even if an external force is applied from the wire 18 toward the terminal 12 due to a displacement such as tension of the wire caused by the swing of the wire 18 or a temperature change, the external force is absorbed by the wire holding pieces 72 and reliably dispersed from the wire holding pieces 72 to the housing 16 via the back retainer 20. As a result, it is reliably suppressed or prevented that the external force is directly transmitted to the terminal 12 in the connector 10 without being dispersed. Therefore, it is possible to prevent problems such as an increase of a contact resistance caused by plating wear and the generation of a spark caused by contact separation when the contact point portion 44 of the terminal 12 with the mating terminal 21 swings due to the external force.

Further, since the wire 18 is fixed to the pair of wire holding pieces 72, 72 of the back retainer 20 using the zip tie 82, the transmission of an external force from the wire 18 to the terminal 12 can be reliably prevented or suppressed by a simple structure. Further, since the wire 18 can be sandwiched between the pair of wire holding pieces 72, 72 projecting at two positions facing each other in the radial direction of the wire insertion hole 62 in this embodiment, the transmission of an external force toward the terminal 12 can be more reliably suppressed or prevented by more reliably absorbing the external force caused by a displacement such as the swing of the wire 18.

Moreover, the radial separation distance r between the projecting tip parts of the wire pressing portions 74 in the pair of wire holding pieces 72, 72 when the wire is not inserted yet is set smaller than the outer diameter R of the wire 18. In this way, even before the wire 18 is tied and fixed using the zip tie 82, the wire 18 can be temporarily held by the pair of wire holding pieces 72, 72. Thus, an operation of tying the wire 18 by the zip tie 82 can be easily performed. Further, since the wire pressing portions 74 can reliably press and bite into the wire 18 from both radial sides during tying, the holding of the wire 18 by the pair of wire holding pieces 72, 72 can be more stably realized.

Further, the accommodation regions 80 for the zip tie 82 can be secured with good space efficiency by a simple structure of providing the pair of outer peripheral walls 76, 76 separated on the outer peripheral sides of the pair of wire holding pieces 72, 72. Furthermore, the escape of the zip tie 82 from the accommodation regions 80 can be stably obstructed by a simple structure of providing the cover wall 78 between the projecting ends of the pair of outer peripheral walls 76, 76.

Other Embodiments

The technique described in this specification is not limited to the above described and illustrated embodiment. For example, the following embodiments are also included in the technical scope of the technique described in this specification.

(1) Although the pair of wire holding pieces 72, 72 are provided to project from the peripheral edge parts at two positions facing each other in the radial direction of the wire insertion hole 62 in the above embodiment, there is no limitation to this. One, three or more wire holding pieces 72 may be provided according to a routing structure of the wire 18 and the like and the projecting positions are also not limited to facing positions.

(2) The tying tool only has to be able to tie and fix the wire 18 to the wire holding pieces 72, and an arbitrary tying tool such as a binding tape can be adopted besides the zip tie 82 illustrated in the above embodiment.

(3) Although the radial separation distance r between the projecting tip parts of the wire pressing portions 74 in the pair of wire holding pieces 72, 72 when the wire is not inserted yet is set smaller than the outer diameter R of the wire 18 in the above embodiment, there is no limitation to this. Even if the radial separation distance r is equal to or larger than the outer diameter R of the wire 18, there is an effect of reliably suppressing or preventing the transmission of an external force to the terminal 12 in the connector 11 as in the above embodiment if the wire holding pieces 72 can be tied and fixed to the wire 18.

(4) Although the wire pressing portion 74 has a hemispherical shape in the above embodiment, there is no limitation to this and an arbitrary shape can be adopted. For example, a wire pressing portion having an arcuate cross-sectional shape and extending in a projecting direction of the wire holding piece 72 may be adopted.

(5) Although the outer peripheral walls 76 are in the form of a pair of projecting pieces in the above embodiment, there is no limitation to this and the outer peripheral walls 76 may have any shape as long as the accommodation regions 80 for the zip tie 82 can be formed in the clearances between the outer peripheral walls 76 and the wire holding pieces 72. For example, the outer peripheral wall 76 may be shaped to project while having an arcuate cross-sectional shape over a predetermined circumferential distance of the wire insertion hole 62 or may be shaped to annularly project around the entire circumference of the wire insertion hole 62. Similarly, the shape of the cover wall 78 is also not limited to an annular shape coupling the projecting end sides of the pair of outer peripheral walls 76, 76 to each other and any shape capable of obstructing the escape of the zip tie 82 from the accommodation regions 80 is included in the scope of the present disclosure.

(6) Although the individual back retainers 20 are respectively mounted on the two wires 18 pulled out from the housing 16 in the above embodiment, the back retainers 20 to be mounted on the respective wires 18 may be integrated with each other if a plurality of the wires 18 are pulled out from the housing 16.

LIST OF REFERENCE NUMERALS

10 connector
12 terminal
14 spring member
16 housing
18 wire
20 back retainer
21 mating terminal
22 mating terminal insertion hole
24 terminal insertion hole
26 cavity
28 spring member accommodating portion
30 engaging hole
32 mating terminal connecting portion
34 core crimping portion
36 bottom wall
38 crimping piece
40 core
42 insulation coating
44 contact point portion
**46*a*, 46*b*** pressing piece
48 coupling portion
50 pressing point
52 spring member retainer
54 engaging hole
56 upper spring member retainer divided body
**56*a*** engaging protrusion
**56*b*** engaging projection
58 lower spring member retainer divided body
**58*a*** engaging protrusion
**58*b*** engaging projection
60 seal member

62 wire insertion hole
64 front surface
66 side wall
68 engaging hole
70 rear surface
72 wire holding piece
74 wire pressing portion
76 outer peripheral wall
78 cover wall
80 accommodation region
82 zip tie (tying tool)
84 strip-like portion
86 head portion
88 insertion hole
90 fitting hole
92 engaging projection

What is claimed is:

1. A connector, comprising:

a housing for accommodating a terminal;

a back retainer mounted in a rear end part of the housing;

a wire connected to the terminal being pulled out from the rear end part of the housing;

a wire insertion hole provided in the back retainer; and a pair of wire holding pieces projecting in a pull-out direction of the wire from a peripheral edge part of the wire insertion hole, the pair of the wire holding pieces respectively disposed on opposite sides of the wire insertion hole, wherein the wire is pulled out from the wire insertion hole and is tied and fixed to each of the pair of wire holding pieces by a tying tool.

2. The connector according to claim 1, wherein the pair of wire holding pieces are cantilevered from the peripheral edge part of the wire insertion hole and provided to project at two positions facing each other in a radial direction of the wire insertion hole, and the wire is sandwiched and tied and fixed between the pair of wire holding pieces from both sides in the radial direction.

3. The connector according to claim 1, further comprising:

a pair of outer peripheral walls formed as projecting pieces respectively separated on outer peripheral sides of the pair of wire holding pieces and projecting in the pull-out direction of the wire; and an annular cover wall projecting from projecting end sides of the pair of outer peripheral walls toward the wire holding pieces and coupling the projecting end sides of the pair of outer peripheral walls to each other, wherein a pair of accommodation regions for the tying tool are formed by a pair of clearances between the pair of wire holding pieces and the pair of outer peripheral walls and escape of the tying tool from the pair of accommodation regions is obstructed by the tying tool contacting the annular cover wall.

4. The connector according to claim 1, wherein each of the pair of wire holding pieces is deflectable and deformable outward in the radial direction.

5. The connector according to claim 1, further comprising:

wire pressing portions respectively provided to project radially inwardly of inner peripheral surfaces of the pair of wire holding pieces.

6. The connector according to claim 5, wherein a radial separation distance between projecting tip parts of the wire pressing portions is set smaller than an outer diameter of the wire.

7. The connector according to claim 5, wherein each of the wire pressing portions has a hemispherical shape.

* * * * *